(12) United States Patent
Deguchi

(10) Patent No.: US 7,101,311 B2
(45) Date of Patent: Sep. 5, 2006

(54) CONTROL SYSTEM FOR CONTINUOUSLY VARIABLE TRANSMISSION OF MOTORCYCLE

(75) Inventor: Hiromi Deguchi, Hamamatsu (JP)

(73) Assignee: Suzuki Motor Corporation, Hamamatsu (JP)

(*) Notice: Subject to any disclaimer, the term of this patent is extended or adjusted under 35 U.S.C. 154(b) by 197 days.

(21) Appl. No.: 10/846,725

(22) Filed: May 13, 2004

(65) Prior Publication Data

US 2004/0235615 A1 Nov. 25, 2004

(30) Foreign Application Priority Data

May 16, 2003 (JP) .............................. 2003-138885

(51) Int. Cl.
*F16H 59/64* (2006.01)

(52) U.S. Cl. .............................. 477/98; 701/55; 477/43

(58) Field of Classification Search .................. 477/43, 477/37, 39, 76, 98, 9; 701/55, 56, 61
See application file for complete search history.

(56) References Cited

U.S. PATENT DOCUMENTS

| | | | | |
|---|---|---|---|---|
| 4,663,990 A | * | 5/1987 | Itoh et al. ...................... | 477/43 |
| 4,713,987 A | * | 12/1987 | Matsumura ................... | 477/46 |
| 4,817,469 A | * | 4/1989 | Shigematsu et al. .......... | 477/43 |
| 5,345,843 A | * | 9/1994 | Fujita et al. ................... | 477/98 |
| 5,556,349 A | * | 9/1996 | Ishii et al. ...................... | 477/76 |
| 5,788,601 A | * | 8/1998 | Kuriyama et al. ............. | 477/71 |
| 6,383,115 B1 | * | 5/2002 | Kawamura .................... | 477/50 |
| 2005/0107194 A1 | * | 5/2005 | Oishi et al. .................... | 474/28 |

FOREIGN PATENT DOCUMENTS

JP 3194641 6/2001

* cited by examiner

*Primary Examiner*—Charles A. Marmor
*Assistant Examiner*—Justin K. Holmes
(74) *Attorney, Agent, or Firm*—Frishauf, Holtz, Goodman & Chick, P.C.

(57) ABSTRACT

A control system for a continuously variable transmission of a motorcycle, which is capable of improving the steerability of the motorcycle in a low-speed range of the motorcycle. The motorcycle includes a centrifugal clutch mechanism disposed between the transmission and a rear wheel, for connection and disconnection between an engine and the rear wheel. An ECU of the motorcycle stores an idle-up use transmission map and a warmed-up use transmission map, and carries out transmission control of the transmission based on the idle-up use transmission map at the start of the engine, and switches the idle-up use transmission map to the warmed-up use transmission map when at least one of a first condition that a predetermined time period preset based on the temperature of the engine has elapsed after the start of the engine and a second condition that rotational speed of the engine is lower than a predetermined idling engine speed is satisfied.

5 Claims, 11 Drawing Sheets

CONTROL SYSTEM FOR CONTINUOUSLY VARIABLE TRANSMISSION OF MOTORCYCLE

BACKGROUND OF THE INVENTION

1. Field of the Invention

The present invention relates to a control system for a continuously variable transmission of a motorcycle, and more particularly to a control system for a continuously variable transmission of a motorcycle, which is equipped with a centrifugal clutch.

2. Description of the Related Art

Conventionally, a motorcycle, such as a scooter, is known in which output from an engine is transmitted to a driving wheel via a continuously variable transmission (CVT) and a centrifugal clutch. A control system for the CVT changes the diameter of a drive pulley, around which a V-belt is stretched, by electronic control to thereby continuously change the transmission ratio, i.e. a ratio between the rotational speed of the engine and that of a drive shaft. More specifically, by searching a transmission map according to the degree of opening of a throttle valve and the speed of the motorcycle, the diameter of the drive pulley is continuously changed to thereby set the transmission ratio to a desired value.

The centrifugal clutch is disposed at a location downstream of the CVT, more specifically, between the CVT and the drive shaft so as to allow a rider to handle the motorcycle with ease when the engine is in stoppage.

The idling speed of the engine is set to a different value depending upon whether the engine is in an idle-up state at the start of the engine or in a warmed-up state after the lapse of a predetermined time period from the start of the engine, in which the engine rotational speed has become stable. In the idle-up state during cold start of the engine, the idling speed is set to a highest value of e.g. 1450 rpm, whereas in the warmed-up state, the idling speed is set to a lowest value of e.g. 1200 rpm.

The centrifugal clutch is configured such that the engine is disconnected from the drive shaft when the idling speed is at the highest value in the idle-up state during cold start. An engine rotational speed (disconnecting rotational speed) at which the engine is disconnected from or connected to the drive shaft is set to a value slightly higher than the highest idling speed, and the disengagement of the centrifugal clutch for disconnecting the engine from the drive shaft is carried out at this engine rotational speed (disconnecting rotational speed).

For this reason, when the engine is being driven at the highest idling speed in the idle-up state, the centrifugal clutch is required to be rotating at a rotational speed not higher than the disconnecting rotational speed. The rotational speed of the centrifugal clutch is increased as the transmission ratio becomes lower, i.e. changed to a higher speed ratio, and therefore, the CVT has to be set to a transmission ratio (disconnecting transmission ratio) not lower than a predetermined transmission ratio at which the centrifugal clutch rotates at the disconnecting rotational speed. To this end, in the above-mentioned transmission map, the transmission ratio is set such that the rotational speed of the centrifugal clutch becomes not higher than the disconnecting rotational speed in a low-speed range of the motorcycle (see the publication of Japanese Patent No. 3194641, for example).

Accordingly, in the warmed-up use where the idling speed is lower than in the idle-up state, for a low-speed range of the motorcycle where the engine is being driven in the vicinity of the idling speed, the transmission map is configured such that the CVT is set to a high transmission ratio, i.e. a low-speed ratio.

On the other hand, in a low-speed range of the motorcycle immediately before stoppage of the motorcycle, i.e. in the low speed range where the engine rotational speed is close to the idling speed, the steerability of the vehicle is better when engine braking is not very effective, and therefore, it is preferred that the centrifugal clutch is disengaged, or the transmission ratio of the CVT is set to a higher speed ratio.

However, when the motorcycle is traveling in a low-speed range, to disengage the centrifugal clutch, it is required to set the transmission ratio of the CVT to a lower speed ratio, and when the transmission ratio is set to such a lower speed ratio, engine braking becomes more effective, which causes further degradation of the steerability of the motorcycle. Further, if the transmission map is configured such that the transmission ratio of the CVT is set to a higher speed ratio when the motorcycle is traveling in the low-speed range in which the engine rotational speed is close to the idling speed, the rotational speed of the centrifugal clutch is increased in this speed range. Therefore, when the engine rotational speed becomes equal to the idling speed in the idle-up state (the highest idling speed as mentioned above), the rotational speed of the centrifugal clutch becomes higher than the disconnecting rotational speed. Therefore, in this speed range the transmission ratio should not be set to such a higher speed ratio.

SUMMARY OF THE INVENTION

It is an object of the present invention to provide a control system for a continuously variable transmission of a motorcycle, which is capable of improving the steerability of the motorcycle in a low-speed range of the motorcycle.

To attain the above object, in a first aspect of the present invention, there is provided a control system for a continuously variable transmission of a motorcycle including an engine having a crankshaft for driving the continuously variable transmission for rotation, a driving wheel, and a centrifugal clutch disposed between the continuously variable transmission and the driving wheel for connecting and disconnecting between the engine and the driving wheel, the control system controlling a transmission ratio of the continuously variable transmission based on a transmission control map, the control system comprising a storage device that stores an idle-up use transmission map and a warmed-up use transmission map as the transmission control map, and a control device that carries out transmission control of the continuously variable transmission based on the idle-up use transmission map at start of the engine, and switches the transmission control map for use in the transmission control to the warmed-up use transmission map when at least one of a first condition that a predetermined time period preset based on a temperature of the engine has elapsed after the start of the engine and a second condition that rotational speed of the engine is lower than a predetermined idling engine speed is satisfied.

With this arrangement of the first aspect of the present invention, when the engine enters a warmed-up state after termination of idle-up, a transmission ratio with respect to the vehicle speed (each engine rotational speed) can be set lower than in the idle-up state of the engine, which makes it possible to make engine braking less effective in the warmed-up state, thereby improving the steerability of the motorcycle in a low-speed range of the motorcycle.

Preferably, the engine includes a throttle valve, and the first condition is satisfied when the predetermined time period preset based on an engine coolant temperature has elapsed after the start of the engine, while the second condition is satisfied when the centrifugal clutch is disengaged, the throttle valve is fully closed, and at the same time the rotational speed of the engine is lower than a range of a idling speed preset for a state in which idle-up of the engine has been completed.

With the arrangement of this preferred embodiment, when idle-up is terminated, it is possible to reliably switch the-idle-up use transmission map to the warmed-up use transmission map.

Preferably, the engine includes a throttle valve, and the control device switches the transmission control map for use in the transmission control to the warmed-up use transmission map when at least one of a third condition that traveling speed of the motorcycle is not lower than a predetermined value and a fourth condition that a degree of opening of the throttle valve is not less than a predetermined value is satisfied in addition to the at least one of the first condition and the second condition.

With the arrangement of this preferred embodiments, it is possible to prevent a rider from feeling poor steerability.

Preferably, the idle-up use transmission map and the warmed-up use transmission map are set such that the transmission ratio of the continuously variable transmission is set to a value based on idling speed of the engine at which the centrifugal clutch is to be engaged or disengaged.

With the arrangement of this preferred embodiment, the function of the centrifugal clutch can be made most of, which makes it possible to carry out the optimal control of the transmission ratio.

To attain the above object, in a second aspect of the present invention, there is provided a control system for a continuously variable transmission of a motorcycle including an engine having a crankshaft for driving the continuously variable transmission for rotation, a driving wheel, and a centrifugal clutch disposed between the continuously variable transmission and the driving wheel for connecting and disconnecting between the engine and the driving wheel, the control system controlling a transmission ratio of the continuously variable transmission based on a transmission control map, the control system comprising a storage device that stores an idle-up use transmission map and a warmed-up use transmission map as the transmission control map, and a control device that carries out transmission control of the continuously variable transmission based on the idle-up use transmission map at start of the engine, and then corrects the idle-up use transmission map based on the warmed-up use transmission map according to an idle-up state of the engine to thereby carry out transmission control of the continuously variable transmission.

With this arrangement of the second aspect of the present invention, engine braking can be made as least effective as possible according to the idle-up state, which contributes to improvement of the steerability of the motorcycle in a low-speed range thereof.

Preferably, the idle-up use transmission map is a high rotational speed map set such that rotational speed of the engine in the idle-up state becomes highest, and the warmed-up use transmission map is a low rotational speed map set such that the rotational speed of the engine in the idle-up state becomes lowest, and said control device calculates interpolated values from the high rotational speed map and the low rotational speed map, based on idling speed of the engine estimated from a temperature of the engine, and carries out the correction for the idle-up use transmission map based on the calculated interpolated values.

With the arrangement of this preferred form, engine braking can be made as least effective as possible according to the idle-up state, in a more suitable manner.

Preferably, the idle-up use transmission map and the warmed-up use transmission map are set such that the transmission ratio of the continuously variable transmission is set to a value based on idling speed of the engine at which the centrifugal clutch is to be engaged or disengaged.

With the arrangement of this preferred embodiment, the function of the centrifugal clutch can be made most of, which makes it possible to carry out the optimal control of the transmission ratio.

The above and other objects, features, and advantages of the invention will become more apparent from the following detailed description taken in conjunction with the accompanying drawings.

BRIEF DESCRIPTION OF THE DRAWINGS

FIGS. 8A and 8B are diagrams showing examples of idle-up maps, in which:

FIG. 8A shows an example of a map of an idling speed set according to coolant temperature and intake air temperature; and FIG. 8B shows an example of a map of an idle-up time period set according to the coolant temperature and the intake air temperature;

DETAILED DESCRIPTION OF THE PREFERRED EMBODIMENTS

The present invention will now be described in detail below with reference to the accompanying drawings showing a preferred embodiment thereof.

Figure 1:
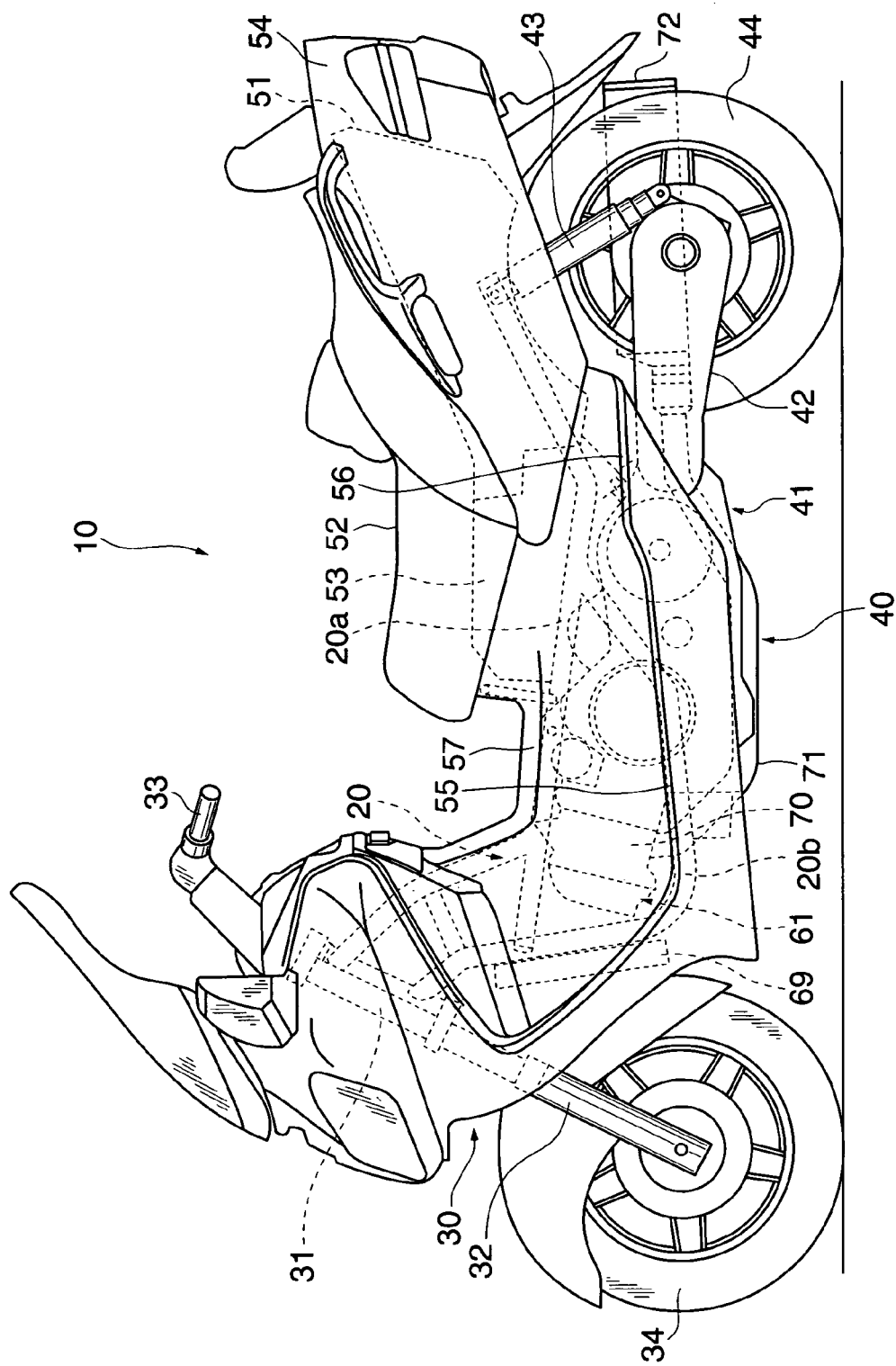
FIG. 1 is a view schematically showing the construction of a motorcycle including a control system for a continuously variable transmission (CVT), according to an embodiment of the present invention.

FIG. 1 is a view schematically showing the construction of a motorcycle including a control system for a continuously variable transmission (CVT), according to an embodiment of the present invention.

As shown in FIG. 1, the motorcycle 10 includes a body frame 20 divided into an upper frame 20a and a lower frame 20b, a front wheel section 30 provided at the front end of the body frame 20, and a rear driving wheel section 40 extending from a lower central part of the body frame 20 to the rear end of the same.

The front-wheel section 30 is comprised of a head pipe 31 disposed at the front end of the body frame 20, a front fork 32 and a handle bar 33 attached to the head pipe 31, and a front wheel 34 mounted on the front fork 32. The front wheel 34 is steered to the left and the right by the handle bar 33.

The rear driving wheel section 40 is comprised of a power unit 41 mounted on the lower central part of the body frame 20, a transmission unit 42 having a front part thereof pivotably mounted on the rear part of the power unit 41, a shock absorber 43 connecting between the rear part of the transmission unit 42 and the rear end of the body frame 20, and a rear wheel 44 as a driving wheel mounted on the rear part of the transmission unit 42. The transmission unit 42 forms a swing arm-type rear wheel suspension.

On the body frame 20, there are provided an article accommodation box (or a tool box) 51 disposed at a location above the rear wheel 44, for accommodating a helmet, baggage, tools, etc., none of which are shown, a rider's seat 52 which is mounted on the accommodation box 13 such that it can be opened or closed as the lid of the accommodation box 51, and a fuel tank 53 disposed between the lower front part of the driver's seat 52 and the power unit 41. Further, the body frame 20 is covered by a body cover 54 formed e.g. of a synthetic resin molded article.

The body frame 20 and the body cover 54 have respective parts thereof forward of the driver's seat 52 bent downward into a generally U shape so as to provide a footing space extending in the transverse direction of the motorcycle body, and a pair of rider's footrest floors 55 are formed at respective opposite sides of the bottom of the U shape, for allowing the rider's feet to be rested thereon. Further, pillion footrest floors 56 for a pillion rider are formed at the rear of the respective rider's footrest floors 55. A convex tunnel-defining part 57 is formed between the footrest floors 55 in a fashion extending in the longitudinal direction of the body.

Figure 2:
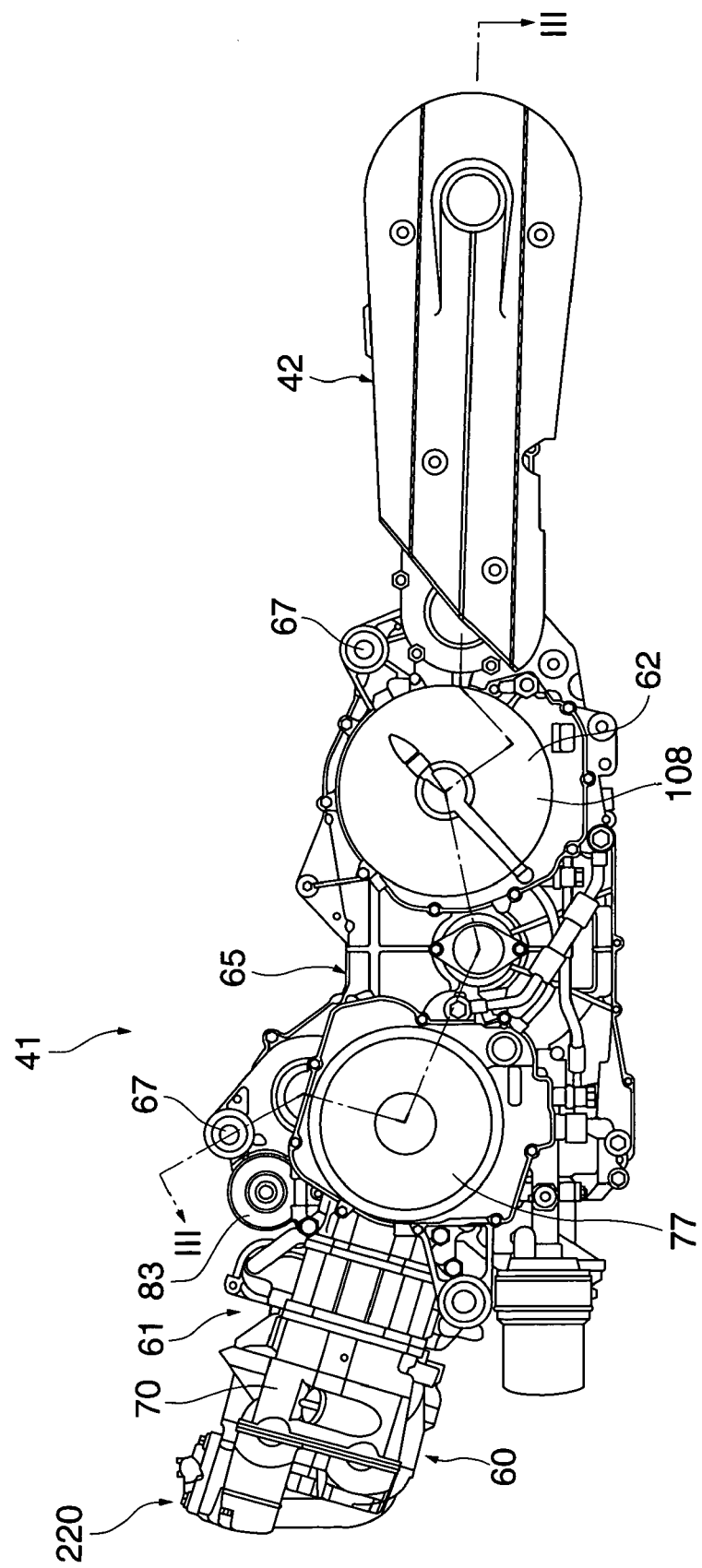
FIG. 2 is a side view of a power unit and a transmission unit appearing in FIG. 1.
Figure 3:
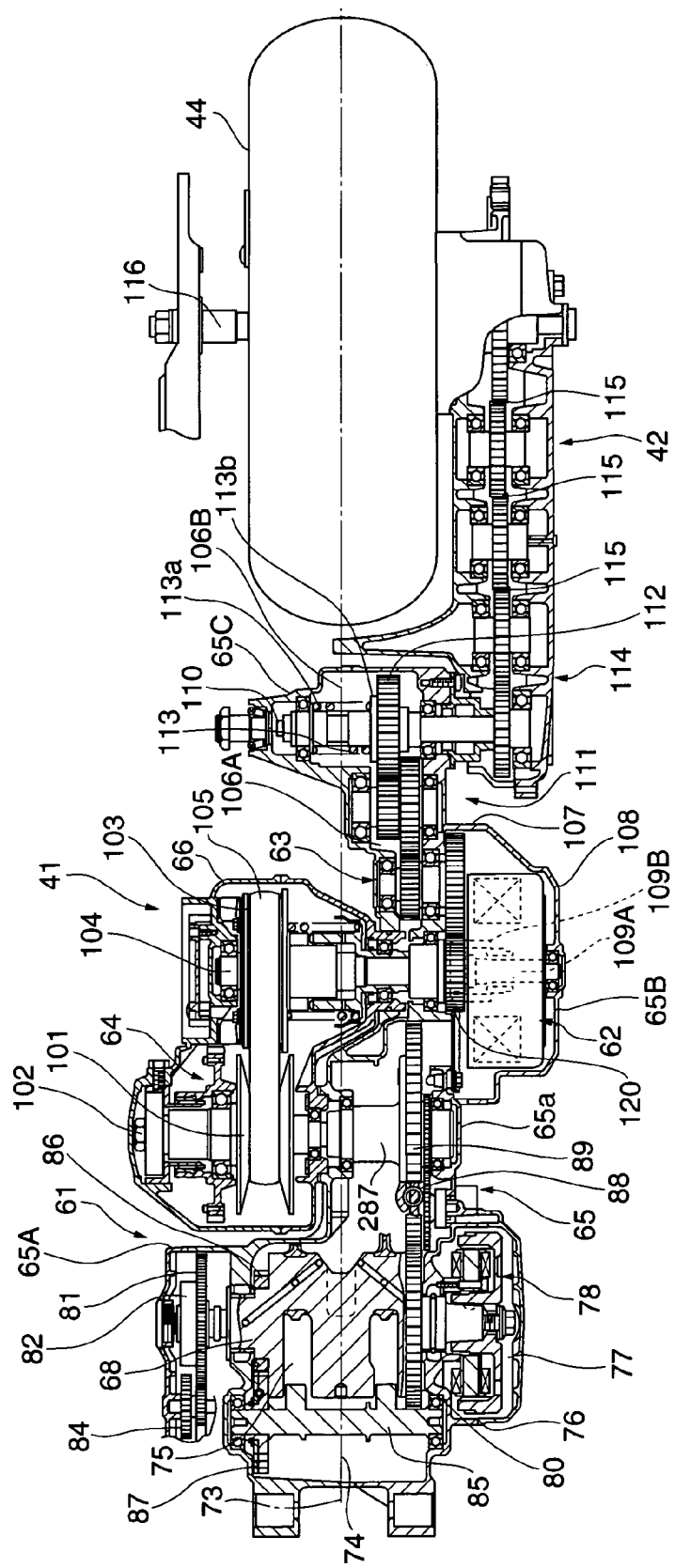
FIG. 3 is a cross-sectional view taken on line III—III in FIG. 2.

FIG. 2 is a side view of the power unit 41 and the transmission unit 42 appearing in FIG. 1, and FIG. 3 is a cross-sectional view taken on line III—III in FIG. 2.

As shown in FIGS. 2 and 3, the power unit 41 is comprised of an engine 61 having a cylinder assembly 60 disposed substantially horizontally at a front part thereof, a wet-type multi-disc centrifugal clutch mechanism 62, a transmission mechanism 63, and a V-belt CVT 64. A rear part of the engine 61, the centrifugal clutch mechanism 62, and the transmission mechanism 63 are housed in a crankcase 65, and the CVT 64 is housed in a transmission case 66. The crankcase 65 is fixed to the body frame 20 via a plurality of brackets 67.

The engine 61 is a so-called water-cooled parallel two-cylinder engine in which two pistons (not shown) are connected to a crankshaft 68 extending in the transverse direction of the motorcycle body. A radiator 69 that cools a coolant for cooling the engine is mounted to the body frame 20 at a location frontward of the engine 61 within the body cover 54.

The cylinder assembly 60 has a cylinder head 70 mounted on a front end thereof, and the cylinder head 70 has a top thereof connected to an intake pipe 121 (see FIG. 4) via a throttle body 220, and a bottom thereof connected to a proximal end of an exhaust pipe 71. The exhaust pipe 71 extends through a lower part of the power unit 41 to a rear part of the motorcycle body, with a muffler 72 attached to a downstream end thereof. The muffler 72 is disposed on the right side of the motorcycle body.

The crankcase 65 is formed e.g. by die-casting. As shown in FIG. 3, the crankcase 65 has a dividing surface 74 extending parallel with the longitudinal axis 73 of the motorcycle body, along which the crankcase 65 can be divided into left and right halves in the transverse direction the motorcycle body. Further, the crankcase 65 can be divided into three parts, i.e. a front crankcase 65A, an intermediate crankcase 65B, and a rear crankcase 65C, as viewed in the longitudinal direction of the motorcycle body.

The front crankcase 65A defines therein a crank chamber 75 in which is disposed the crankshaft 68 with opposite ends thereof supported by the front crankcase 65A. Further, a left-hand front part of the crankcase 65 has an opening defined therein by an annular wall 76. This opening is covered by an alternator cover 77, and has a magnet chamber formed inside. The left end of the crankshaft 68 protrudes into the magnet chamber, and an alternator 78 is mounted on the protruding end of the crankshaft 68.

Within the crank chamber 75, the crankshaft 68 has a primary drive gear 80 and a balancer drive gear 86 mounted on a left-side part and a right-side part thereof, respectively. Further, the crankshaft 68 has a starter driven gear 81 and a starter clutch 82 mounted on a right end thereof. The starter driven gear 81 is operatively connected via a starter idle gear 84 to a starter motor 83 disposed in an upper front part of the crankcase 65.

Above and below the crankshaft 68, there are arranged a pair of balancer shafts 85 (only the upper one is shown in FIG. 3) extending parallel therewith, which form respective balancer devices. In the upper balancer device, the balancer shaft 85 thereof is provided with a balancer driven gear 87 in mesh with the balancer drive gear 86 of the crankshaft 68, whereby the balancer shaft 85 is driven for rotation in unison with the crankshaft 68. The lower balancer device is basically identical in construction to the upper balance device.

A left-hand rear part of the front crankcase 65A extends rearward from the rear of the primary drive gear 80 as indicated by reference numeral 65a such that the crank chamber 75 is formed to have an L shape in plan view. Within the extended part 65a, there is disposed a counter shaft 287 extending parallel with the crankshaft 68. The counter shaft 287 is rotatably supported by the front crankcase 65A.

The counter shaft 287 is provided with a primary driven gear 89. The primary driven gear 89 is constantly operatively connected, via a damper device e.g. a well-known primary damper 88, to the primary drive gear 80 mounted on the crankshaft 68, to form a primary reduction device together therewith, whereby torque of the crankshaft 68 is transmitted to the counter shaft 287. Further, the primary damper 88 disposed between the counter shaft 287 and the primary driven gear 89 accommodates abrupt variations in rotation and torque, i.e. vibrations, which occur between the counter shaft 287 and the primary driven gear 89.

On the right side of the extended part 65a of the front crankcase 65A and the intermediate crankcase 65B located rearward of the extended part 65a, there is disposed the transmission case 66 containing the CVT 64. The CVT 64 is comprised of a drive shaft 102 having a drive pulley 101 and functioning as an input shaft of the CVT 64, and a driven shaft 104 having a driven pulley 103 and functioning as an output shaft of the CVT 64. The drive shaft 102 is disposed coaxially with the counter shaft 287 at the rear of the crankshaft 68 and at the same time connected to the counter shaft 287 e.g. by a spline joint, while the driven shaft 104 extends parallel with the drive shaft 102 at the rear thereof. A V-belt 105 is stretched around the drive pulley 101 and the driven pulley 103, and the torque of the engine 61 is transmitted from the drive pulley 101 to the driven pulley 103, via the V-belt 105, and hence to the shaft 104. The left end of the driven shaft 104 protrudes into the intermediate crankcase 65B.

The intermediate crankcase 65B and the rear crankcase 65C located rearward thereof define a transmission chamber 106 therein. The transmission chamber 106 is formed of a front transmission chamber 106A defined within the intermediate crankcase 65B and a rear transmission chamber 106B defined within the rear crankcase 65C. Further, a left-hand intermediate part of the crankcase 65 has an opening defined therein by an annular wall 107. This opening is covered by a clutch cover 108 to form a clutch chamber inside. The left end of the driven shaft 104, i.e. the output side of the driven pulley 103 protrudes into the clutch chamber, and the centrifugal clutch mechanism 62 is mounted on the protruding end of the driven pulley 103 via an inner clutch shaft 109A as an input shaft and an outer clutch shaft 109B as an output shaft.

The inner clutch shaft 109A is fitted to the left end of the driven shaft 104 in the front transmission chamber 106A within the intermediate crankcase 65B. A part of the inner clutch shaft 109A close to the fitting part of the same is rotatably supported by the intermediate crankcase 65B e.g. via a bearing, and an output gear 120 is disposed in the vicinity of the fitting part of the outer clutch shaft 109B covering the outer periphery of the part of the inner clutch shaft 109A close to the fitting part of the same.

A secondary output shaft 110 as the input shaft of a final reduction device, which forms an element of the transmission mechanism 63, is provided in the rear transmission chamber 106B within the rear crankcase 65C. The secondary output shaft 110 extends parallel with the driven shaft 104. The driven shaft 104 and the secondary output shaft 110 are connected to each other via the output gear 120 fitted on the outer clutch shaft 109B, a fixed-ratio reduction gear train 111 which forms an element of the transmission mechanism 63 and is comprised of two other reduction gears in constant mesh with the output gear 120, and an input gear 112 fitted on the secondary output shaft 110, as an element of the transmission mechanism 63. The torque of the engine 6, which is changed in rotational speed by the CVT 64, is transmitted to the secondary output shaft 110, while the transmission of the torque is selectively permitted or blocked by engagement or disengagement of the centrifugal clutch mechanism 62.

The input gear 112 also functioning as a final gear of the reduction gear train 111 is fitted on the secondary output shaft 110 via a mechanical damper 113 as a damper device, for example. The mechanical damper 113 is implemented by a known damper having a cam mechanism 113b urged e.g. by a spring 113a. The mechanical damper 113 and the input gear 112 are coaxially fitted on the secondary output shaft 110.

The torque of the engine 61 transmitted to the secondary output shaft 110 is further transmitted to an axle shaft 116 of the rear wheel 44 via a plurality of transmission-gears 115, 115, . . . housed in the transmission unit 42 and forming a constant-speed gear train 114 as a torque-transmitting device for transmitting the torque of the power unit 41 to the rear wheel 44.

Figure 4:
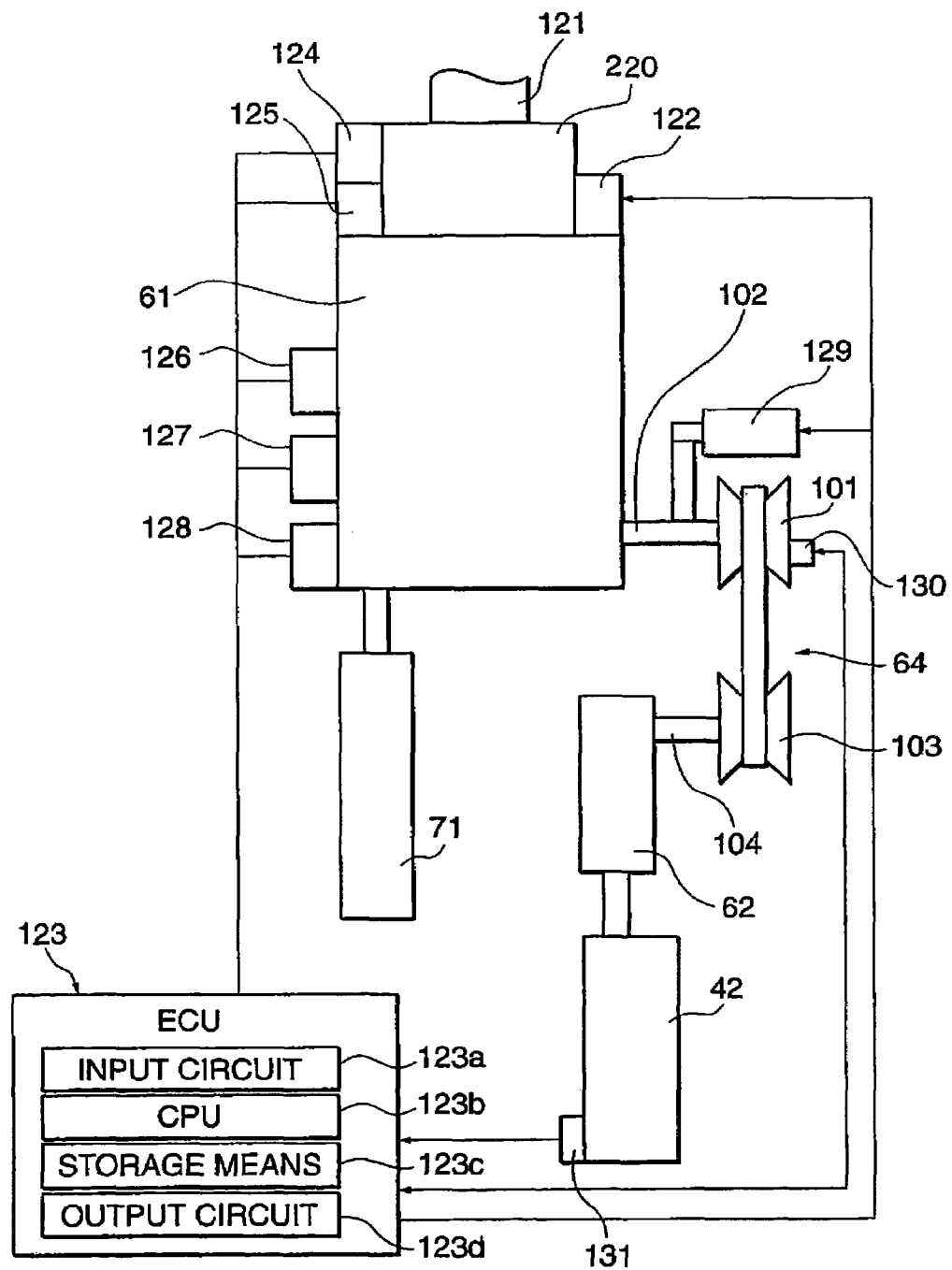
FIG. 4 is a view schematically showing the construction of an engine, a centrifugal clutch mechanism and the CVT.

FIG. 4 is a view schematically showing the construction of the engine 61, the centrifugal clutch mechanism 62 and the CVT 64.

As shown in FIG. 4, the throttle body 220 of the engine 61 is connected to an air cleaner box, not shown, via the intake pipe 121. The throttle body 220 is provided with a throttle valve 133, described hereinafter with reference to FIG. 5. A throttle position (TP) sensor 122 is connected to the throttle valve 133, and outputs an electric signal indicative of a sensed throttle valve opening to an electronic control unit (ECU) 123 that controls the engine 61. The throttle valve 133 has the opening thereof controlled by a throttle cable operated by the rider.

Figure 5:
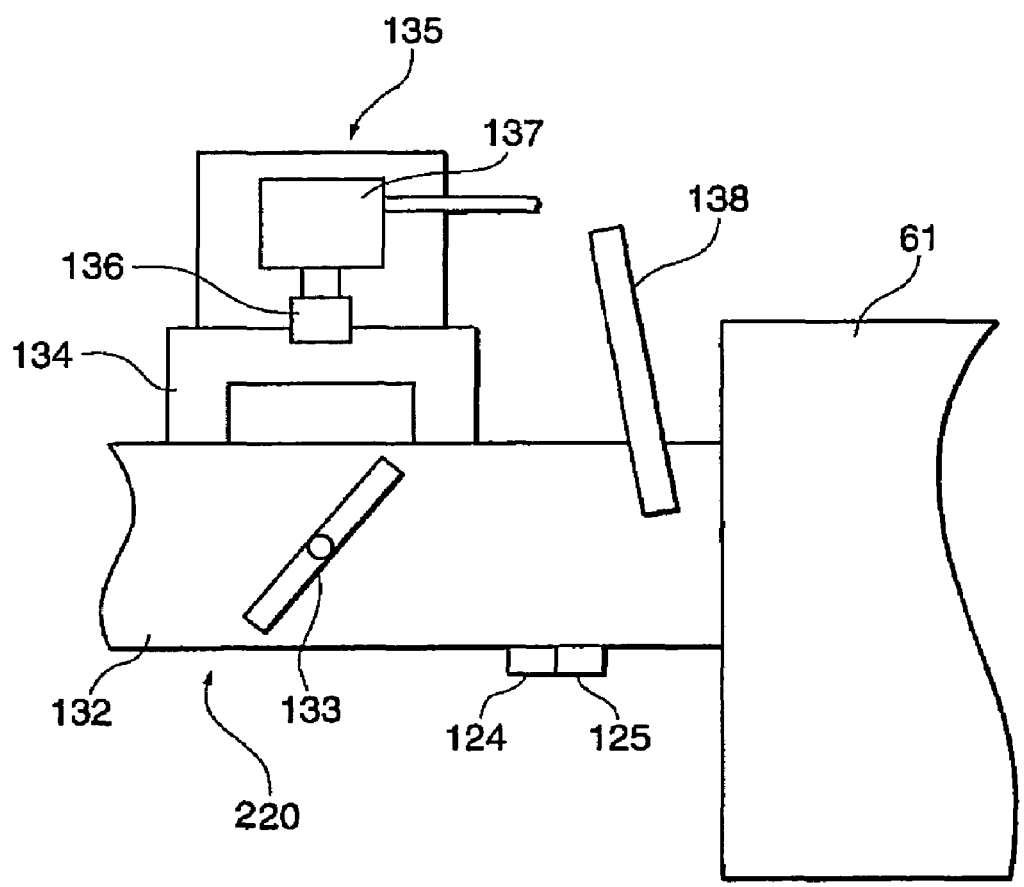
FIG. 5 is a view schematically showing the construction of a throttle body appearing in FIG. 4.

In the throttle body 220, fuel injection valves 138, only one of which is shown in FIG. 5, are provided for the respective cylinders at respective locations between the throttle valve 133 and the engine 61 and slightly upstream of associated intake valves, not shown. Each of the fuel injection valves 138 is connected to a fuel pump, not shown, and electrically connected to the ECU 123. The valve opening time period of the fuel injection valve 138 is controlled by a signal from the ECU 123.

Further, an intake air pressure (IAP) sensor 124 and; an intake air temperature (IAT) sensor 125 are inserted into the throttle body 220 at respective locations between the throttle valve 133 and the fuel injection valves 138. The IAP sensor 124 senses intake air pressure and delivers an electric signal indicative of the sensed intake air pressure to the ECU 123. The IAT sensor 125 senses intake air temperature and delivers an electric signal indicative of the sensed intake air temperature to the ECU 123.

Mounted on the engine 61 is a coolant temperature sensor 126, which senses the temperature of coolant and delivers an electric signal indicative of the sensed coolant temperature.

An engine rotational speed (NE) sensor 127 and a cylinder-discriminating (CYL) sensor 128 are arranged in facing relation to a camshaft or a crankshaft of the engine 61, neither of which is shown. The NE sensor 127 generates a TDC signal pulse at a predetermined crank angle with respect to the top dead center (TDC) of each cylinder corresponding to the start of the intake stroke thereof, while the CYL sensor 128 generates a CYL signal pulse at a predetermined crank angle position of a particular cylinder of the engine, both of the pulses being supplied to the ECU 123.

The CVT 64 is comprised of a CVT motor 129 capable of changing the diameter of the drive pulley 101 by changing the width of the drive pulley 101, and a pulley position sensor 130 that senses the width of the drive pulley 101 and delivers an electric signal indicative of the sensed pulley width to the ECU 123. The CVT motor 129 changes the diameter of the drive pulley 101 in response to an electric signal from the ECU 123 to thereby change the transmission ratio between the rotational speed of the engine 61 and that of the centrifugal clutch mechanism 62.

A vehicle speed sensor 131 is inserted into the transmission unit 42. The vehicle speed sensor 131 senses the vehicle speed of the motorcycle 10 and delivers an electric signal indicative of the sensed vehicle speed to the ECU 123.

The ECU 123 is comprised of an input circuit 123a having the functions of shaping the waveforms of input signals from various sensors including the above-mentioned ones, shifting the voltage levels of sensor output signals to a predetermined level, converting analog signals from analog-output sensors to digital signals, and so forth, a central processing unit (CPU) 123b, a storage means 123c storing various operating programs to be executed by the CPU 123b, various maps and tables for use in executing the operating programs, results of calculations, etc., and an output circuit 123*d* which outputs driving signals to the fuel injection valves 138 and the CVT motor 129.

In the ECU 123, the CPU 123*b* changes ignition timing and the degree of opening of each fuel injection valve 138 based on signals from various sensors, to thereby control the torque or output from the engine 61. Further, the storage means 123*c* stores a transmission map of predetermined transmission ratio values set in association with the throttle valve opening and the vehicle speed, and the CPU 123*b* searches the transmission map to retrieve a transmission ratio value corresponding to values of the throttle valve opening, the engine rotational speed, and the vehicle speed detected respectively by the TP sensor 122, the NE sensor 127 and the vehicle speed sensor 131, and drives the CVT motor 129 to change the transmission ratio of the CVT 64 to the retrieved transmission ratio value, thereby controlling the transmission ratio of the CVT 64.

The transmission map stored in the storage means 123*c* includes an idle-up use transmission map and a warmed-up use transmission map, described hereinafter as the transmission maps, with reference to FIG. 6.

FIG. 5 is a view schematically showing the construction of the throttle body 220 appearing in FIG. 4.

As shown in FIG. 5, the throttle body 220 is comprised of a main air passage 132, the throttle valve 133 disposed in the main air passage 132, a bypass air passage 134 having opposite ends thereof opening into the main air passage 132 upstream and downstream of the throttle valve 133, respectively, for allowing intake air to bypass the throttle valve 133, and a PTC (Positive Temperature Coefficient) thermistor-type automatic starter 135 for adjusting the passage area of the bypass air passage 134. Further, the fuel injection valves 138 are disposed in the main air passage 132 at respective locations downstream of the bypass air passage 134, and the IAP sensor 124 and the IAT sensor 125, referred to hereinabove with reference to FIG. 4, are inserted into the main air passage 132 at respective locations between the bypass air passage 134 and the fuel injection valves 138.

The automatic starter 135 is comprised of a piston valve 136 disposed to open and close the bypass air passage 134, and a starter body 137 for moving the piston valve 136. The automatic starter 135 opens and closes the bypass air passage 134 by moving the piston valve 136, to thereby control the amount of intake air to be supplied to the engine 61.

The starter body 137 is comprised of an electric heater, not shown, wax, not shown, and a spring, not shown, for biasing the piston valve 136 in the direction of increasing the passage area of the bypass air passage 134. When the temperature of the wax is low, the piston valve 136 is biased by the spring to fully open the bypass air passage 134. The electric heater is energized to raise the temperature of the wax, thereby causing expansion of the wax, which causes the piston valve 136 to be moved in the direction of decreasing the passage area of the bypass air passage 134. Then, when the temperature of the wax becomes not lower than a predetermined temperature, the piston valve 136 fully closes the bypass air passage 134.

In this way, when the temperature of the wax falls, the piston valve 136 is biased by the spring to increase the passage area of the bypass air passage 134, whereby the amount of intake air is increased to raise the rotational speed of the engine 61. On the other hand, when the temperature of the wax rises, the piston valve 136 is moved by the expansion of the wax to decrease the passage area of the bypass air passage 134, whereby the amount of intake air is reduced to lower the rotational speed of the engine 61. As a result, the idling speed in the idling state of the engine where the throttle valve 133 is fully closed is increased or reduced by the automatic heater 135, whereby the idling speed of the engine 61 is increased for idle-up at the start of the engine.

Upon cold start of the engine 61, where the temperature of the wax in the automatic starter 135 is low, the bypass air passage 134 is fully opened, whereby the amount of intake air for idle-up is maximized, which maximizes the idling speed. When the engine 61 is started, energization of the heater is started, and with a rise in the temperature of the wax, the piston valve 136 is moved to reduce the passage area of the bypass air passage 134. Then, when the temperature of the wax becomes not lower than the predetermined temperature, the bypass air passage 134 is fully closed, and the idle-up is terminated.

The amount of intake air for idle-up by the automatic starter 135 depends only on the temperature of the wax in the starter body 137, while the temperature of the wax is basically influenced by the temperature of coolant for the engine 61 and the ambient temperature of the wax itself. Therefore, by using the engine coolant temperature at the start of the engine 61 and the temperature of intake air as a substitute for the ambient temperature, as parameters, it is possible to detect the position of the piston valve 136, i.e. the passage area of the bypass air passage 134 under various conditions.

When the amount of intake air for idle-up, e.g. during cold start of the engine 61 is at the maximum (maximum idle-up state), the idling speed is increased to a maximum idling speed, e.g. 1450 rpm, whereas when the idle-up is terminated after a rise in the coolant temperature in the engine 61 (warmed-up state), the idling speed is reduced to a minimum idling speed, e.g. 1200 rpm.

The centrifugal clutch mechanism 62 is designed to disconnect between the engine 61 and the transmission unit 42 when the rotational speed of the centrifugal clutch mechanism 62 becomes not higher than a predetermined rotational speed.

Figure 6:
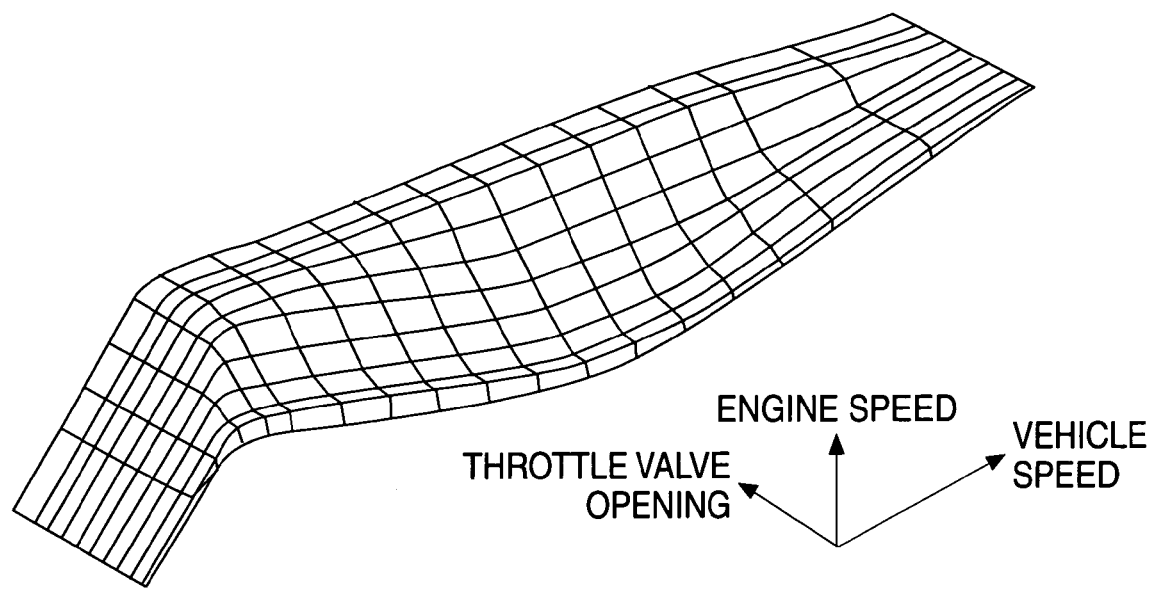
FIG. 6 is a diagram showing an example of a transmission map.

FIG. 6 is a diagram of an example of the transmission map.

The storage means 123*c* of the ECU 123 stores the idle-up use transmission map in which the transmission ratio is set at values for idle-up use such that the centrifugal clutch mechanism 62 is disengaged to disconnect between the engine 61 and the transmission unit 42 when the engine rotational speed is lower than a rotational speed slightly higher than the maximum idling speed, and the warmed-up use transmission map in which the transmission ratio is set at values for use in the warmed-up state of the engine such that the centrifugal clutch mechanism 62 is disengaged when the engine rotational speed is lower than a rotational speed slightly higher than the minimum idling speed.

As described in detail hereinafter with reference to FIG. 7, in the maximum idle-up state, the CPU 123*b* sets the idle-up use transmission map to a control transmission map (transmission control map), and controls the transmission ratio of the CVT 64 by searching the control transmission map, while in the warmed-up state, the CPU 123*b* sets the warned-up use transmission map to the control transmission map, and controls the transmission ratio of the CVT 64 by searching the control transmission map. Further, as described in detail hereinafter with reference to FIGS. 10 and 11, during a transition from the maximum idle-up state to the warmed-up state, or from the warmed-up state to the maximum idle-up state, the CPU 123*b* calculates the value of a weighted transmission ratio, referred to later, to thereby obtain a weighted transmission map, whereafter the CPU 123*b* sets the weighted transmission map to the control transmission map, and controls the transmission ratio of the CVT 64 by searching the control transmission map.

The weighted transmission map is used when the throttle valve 133 is fully closed during each transition, and is calculated using a weighting coefficient calculated based on the idling speed estimated from the engine temperature, etc., the idle-up use transmission map, and the warmed-up use transmission map.

Figure 8A:
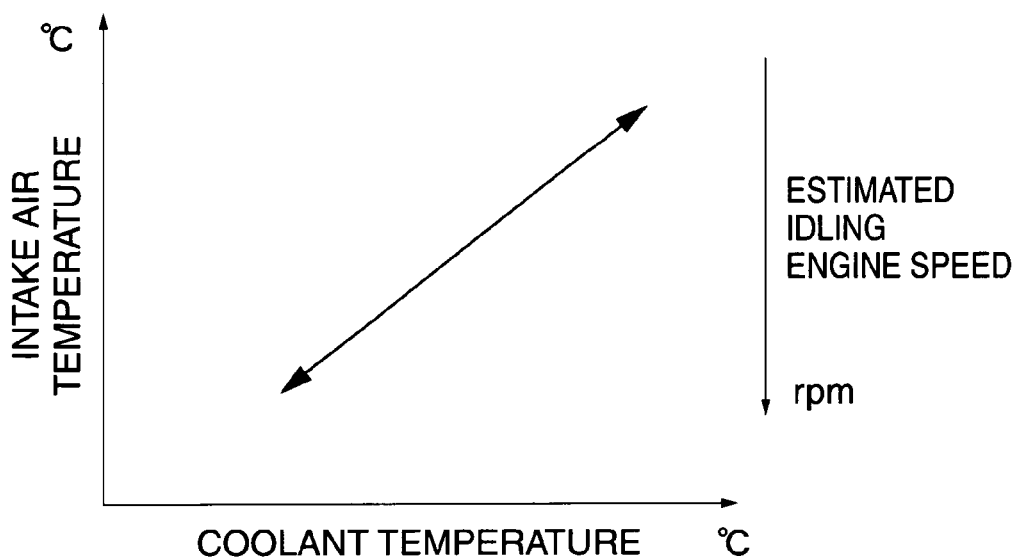
Figure 8B:
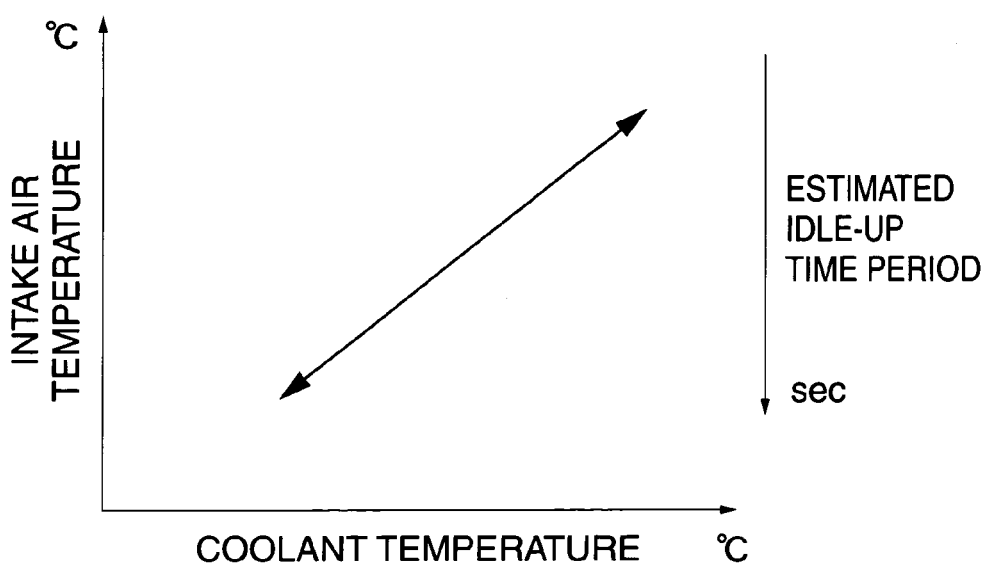

The idling speed during each transition is set by setting an idling speed (estimated idling speed) estimated from the coolant temperature and the intake air temperature at the start of the engine, and a time period (estimated idle-up time period) estimated as a required time period from the engine start to termination of the idle-up state, and then searching idle-up maps, described in detail hereinafter with reference to FIGS. 8A and 8B, stored in the storage means 123c, according to the estimated idling speed and the estimated idle-up time period. The amount of intake air for idle-up by the automatic starter 135 can be detected from the coolant temperature and the intake air temperature as described hereinabove, and therefore each of the idle-up maps stores values of the idling speed and values of the time period to be taken before termination of the idle-up state, which correspond to values empirically obtained in advance.

By controlling the transmission ratio in the above-described way, the transmission ratio in the warmed-up state can be set lower than that in the maximum idle-up state, which makes it possible to make engine braking less effective in a low-speed range of the vehicle in the warmed-up state.

A description will now be given of transmission control processes executed by the control system for the CVT, according to the present embodiment.

Figure 7:
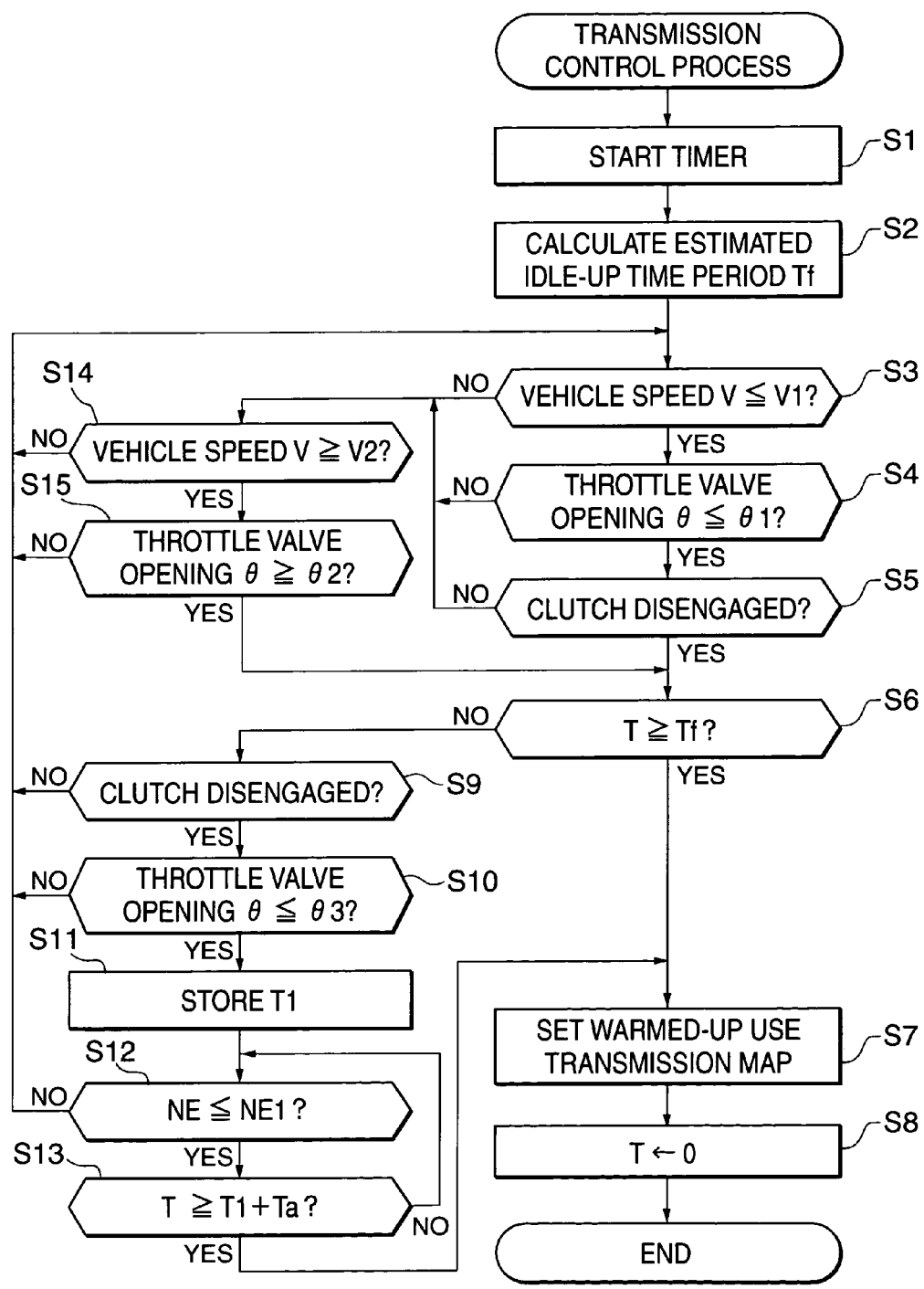
FIG. 7 is a flowchart of a first transmission ratio control process executed by the control system for the CVT.

FIG. 7 is a flowchart of a first transmission control process executed by the control system for the CVT.

The first transmission control process is started upon starting of the engine 61. During the start of the engine 61, the idle-up use transmission map is set to the control transmission map.

In the present transmission control process, it is determined whether or not the engine 61 is idling and whether engine braking is not operating, whereafter only when the engine 61 is idling or when engine braking is not operating, the transmission map is changed. This is because if the transmission map is changed for the motorcycle 10 when engine braking is operating, the rider feels poor steerability.

First, a timer is started to count a time period elapsed after the engine start (step S1). The initial value of the counted time T is "0". Then, an estimated idle-up time period Tf corresponding to the intake air temperature and the coolant temperature detected by the IAT sensor 125 and the coolant temperature sensor 126, respectively, is calculated by searching the idle-up map (FIG. 8B) (step S2).

Then, it is determined whether or not the vehicle speed V is not higher than a predetermined value V1 (step S3). If the vehicle speed V is not higher than the predetermined value V1 (YES to step S3), it is determined whether or not the throttle valve opening θ is equal to or smaller than a predetermined value θ1 (step S4). If the throttle valve opening θ is equal to or smaller than the predetermined value θ1 (YES to step S4), it is determined whether or not the centrifugal clutch mechanism 62 is disengaged (step S5). If the centrifugal clutch mechanism 62 is disengaged (YES to step S5), it is judged that the engine 61 is idling, and then it is determined whether or not the counted time T of the timer is equal to or longer than the estimated idle-up time period Tf (step S6).

The determination as to whether or not the centrifugal clutch mechanism 62 is disengaged is made by detecting a difference between the rotational speed of an input clutch, not shown, of the centrifugal clutch mechanism 62 and that of an output clutch, not shown, of the same, and determining whether or not the difference in the rotational speed is not lower than a predetermined value. If the difference in the rotational speed is not lower than the predetermined value, it is judged that the centrifugal clutch mechanism 62 is disengaged.

If the counted time T of the timer is equal to or longer than the estimated idle-up time period Tf (YES to the step S6), it is judged that idle-up has been terminated and the engine 61 has entered the warmed-up state, and the control transmission map is switched from the idle-up use transmission map to the warmed-up use transmission map (step S7). Then, the counted time T of the timer is reset to "0" (step S8), followed by terminating the present process.

Figure 9:
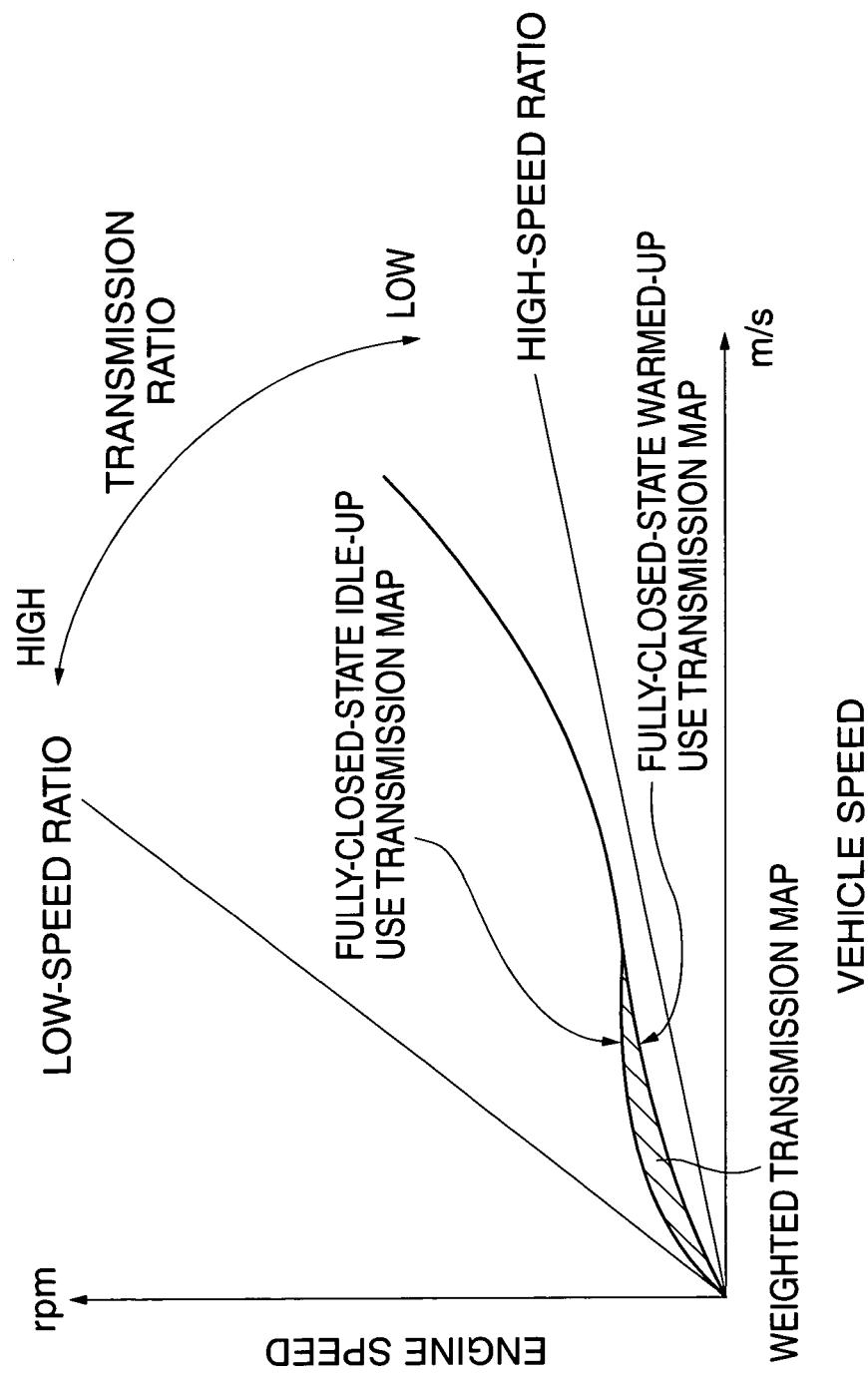
FIG. 9 is a diagram showing a fully-closed-state idle-up use transmission map as a part of an idle-up use transmission map, and a fully-closed-state warmed-up use transmission map as a part of a warmed-up use transmission map.

The intensity or effectiveness of engine braking of the motorcycle 10 can be adjusted through setting of a transmission map for use when the throttle valve opening is zero, that is, depends upon the transmission ratio set by the transmission map. So long as the vehicle speed remains constant, engine braking is less effective as the transmission ratio is lower. FIG. 9 is a diagram showing a transmission map used as an idle-up use transmission map when the throttle valve opening is zero (fully-closed-state idle-up use transmission map) and a transmission map used as a warmed-up use transmission map when the throttle valve opening is zero (fully-closed-state warmed-up use transmission map). When the control transmission map is switched from the idle-up use transmission map to the warmed-up use transmission map, the transmission ratio for each vehicle speed is reduced, which makes it possible to make engine braking less effective in the warmed-up state, thereby improving steerability of the vehicle.

On the other hand, if the counted time T of the timer is shorter than the estimated idle-up time period Tf (NO to the step S6), it is determined whether or not the centrifugal clutch mechanism 62 is disengaged (step S9). If the centrifugal clutch mechanism 62 is disengaged (YES to the step S9), it is determined whether or not the throttle valve opening is equal to or smaller than a value θ3 set as a throttle valve opening for idling (step S10). If the throttle valve opening is equal to or smaller than the value θ3 (YES to the step S10), it can be judged that the engine 61 is idling, so that the process proceeds to a step S11 wherein the counted time T of the timer is stored as a measured time T1.

Then, it is determined whether or not a state where the engine rotational speed NE is not higher than a rotational speed NE1 higher than the idling speed in the warmed-up state, i.e. the minimum idling speed NEmin, by a predetermined rotational speed has been maintained over a predetermined time period Ta or longer (steps S12 and S13). If the engine rotational speed NE has been not higher than the rotational speed NE1 over the predetermined time period Ta or longer (YES to the steps S12 and S13), it can be judged that the engine rotational speed NE has been stable at approximately the minimum idling speed NEmin over the predetermined time period Ta or longer, which means that the engine 61 has terminated the idle-up state and entered the warmed-up state, and therefore the process proceeds to the step S7.

On the other hand, if it is not determined that the engine 61 is idling, i.e. if the centrifugal clutch mechanism 62 is not disengaged (NO to the step S9) or if the throttle valve opening is larger than the predetermined value θ3 (NO to the step S10), or if it is not determined that the engine 61 has entered the warmed-up state after termination of the idle-up state, i.e. if it is not determined that the engine rotational speed NE has been not higher than the rotational speed NE1 over the predetermined time period Ta or longer (NO to the step S12), the process returns to the step S3.

If it is determined that the engine 61 is not idling, i.e. if the vehicle speed V is higher than the predetermined value V1 (NO to the step S3), if the throttle valve opening θ is larger than the predetermined value θ1 (NO to the step S4), or if the centrifugal clutch mechanism 62 is not disengaged (NO to the step S5), it is determined whether or not the vehicle speed V is not lower than a predetermined value V2 (step S14).

If the vehicle speed V is not lower than the predetermined value V2 (YES to the step S14), it is determined whether or not the throttle valve opening θ is equal to or larger than a predetermined value θ2 (step S15). If the throttle valve opening θ is equal to or larger than the predetermined value θ2 (YES to the step S15), it is judged that the motorcycle 10 is in a state where engine braking is not operating, and the process proceeds to the step S6.

On the other hand, if it is determined that the motorcycle 10 is in a state where engine braking is operating, i.e. if the vehicle speed V is lower than the predetermined value V2 (NO to the step S14) or if the throttle valve opening θ is smaller than the predetermined value θ2 (NO to the step S15), the process returns to the step S3.

As described above, according to the present first transmission control process, when the idle-up state has been terminated, and the engine 61 has entered the warmed-up state, i.e. when the counted time T of the timer has reached or exceeded the estimated idle-up time period Tf calculated by searching the idle-up map (FIG. 8B) (YES to the step S6), or when the engine rotational speed NE has been stable at approximately the minimum idling speed NEmin over the predetermined time period Ta or longer, i.e. when the engine rotational speed NE has been not higher than the rotational speed NE1 over the predetermined time period Ta or longer (YES to the steps S12 and S13), the control transmission map is switched from the idle-up use transmission map to the warmed-up use transmission map (step S7). Therefore, when the engine 61 has entered the warmed-up state after termination of the idle-up state, a transmission ratio for each engine rotational speed can be set lower than in the idle-up state, whereby engine braking becomes less effective in the warmed-up state.

Further, according to the present transmission control process, when the vehicle speed V is not higher than the predetermined value V1 (YES to the step S3), the throttle valve opening θ is equal to or smaller than the predetermined value θ1 (YES to the step S4), and the centrifugal clutch mechanism 62 is disengaged (YES to the step S5), i.e. when it is determined that the engine 61 is idling, or when the vehicle speed V is not lower than the predetermined value V2 (YES to the step S14), and the throttle valve opening θ is equal to or larger than the predetermined value θ2 (YES to the step S15), i.e. when it is determined that the motorcycle 10 is in a state where engine braking is not operating, the control transmission map is switched from the idle-up use transmission map to the warmed-up use transmission map (step S7). Therefore, the control transmission map can never be switched when the motorcycle 10 is in a state where engine braking is operating, which makes it possible to prevent the rider from having poor steerability.

Furthermore, according to the present transmission control process, when it is determined that the engine 61 is idling (YES to the steps S9 and S10), and when it is determined that the engine 61 has entered the warmed-up state after termination of the idle-up state (YES to the steps S12 and S13), the control transmission map is switched from the idle-up use transmission map to the warmed-up use transmission map (step S7), so that it is possible to switch the control transmission map at a time point closer to the actual termination of the idle-up state, thereby preventing engine braking of the motorcycle 10 from becoming too effective.

In the step S2, the estimated idle-up time period Tf is calculated based on the coolant temperature, the intake air temperature, and the idle-up map (FIG. 8B), and therefore there is a possibility that the estimated idle-up time period Tf differs from the actual idle-up time period. If the estimated idle-up time period Tf is shorter than the actual idle-up time period, the engine 61 can stall or other inconveniences can occur. Therefore, in the idle-up maps, the estimated idle-up time period Tf corresponding to the coolant temperature and the intake air temperature is set such that it cannot be shorter than the actual idle-up time period.

Figure 10:
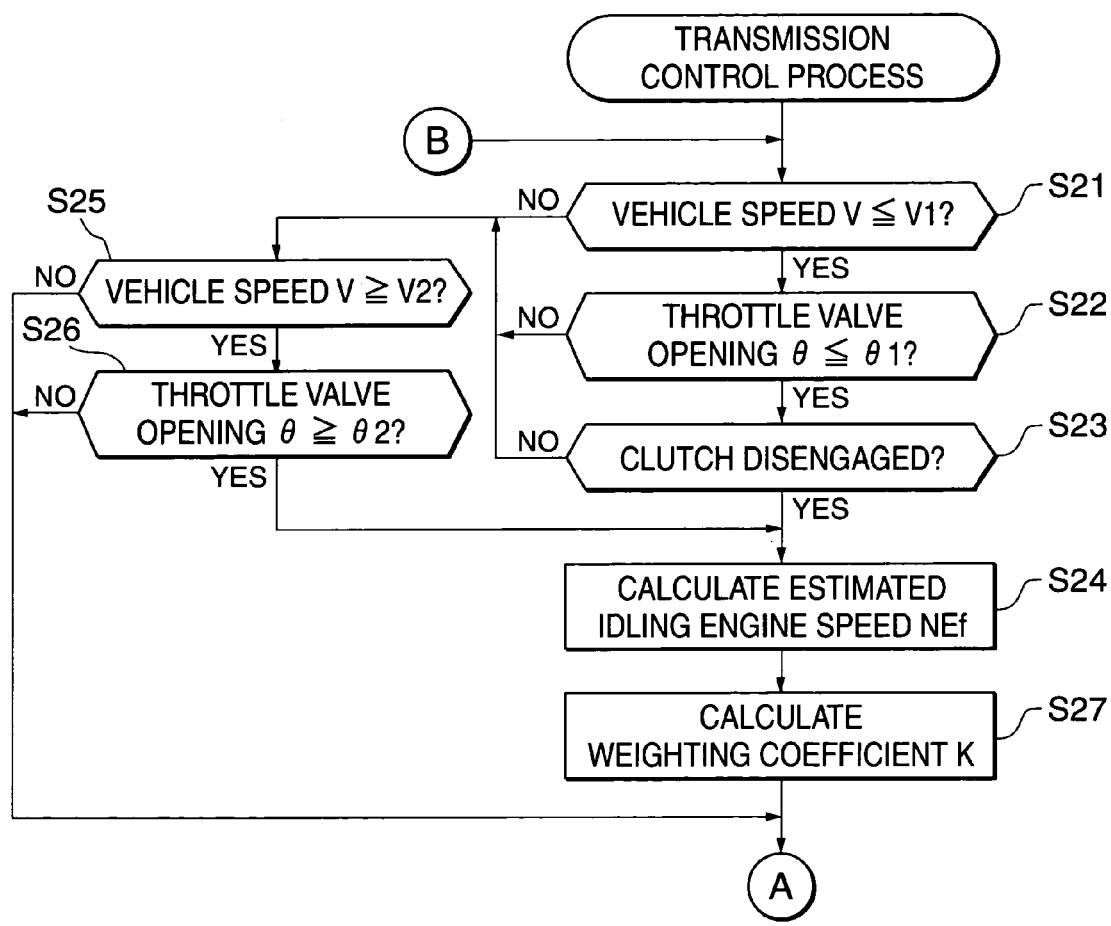
FIG. 10 is a flowchart of a second transmission ratio control process executed by the control system for the CVT.
Figure 11:
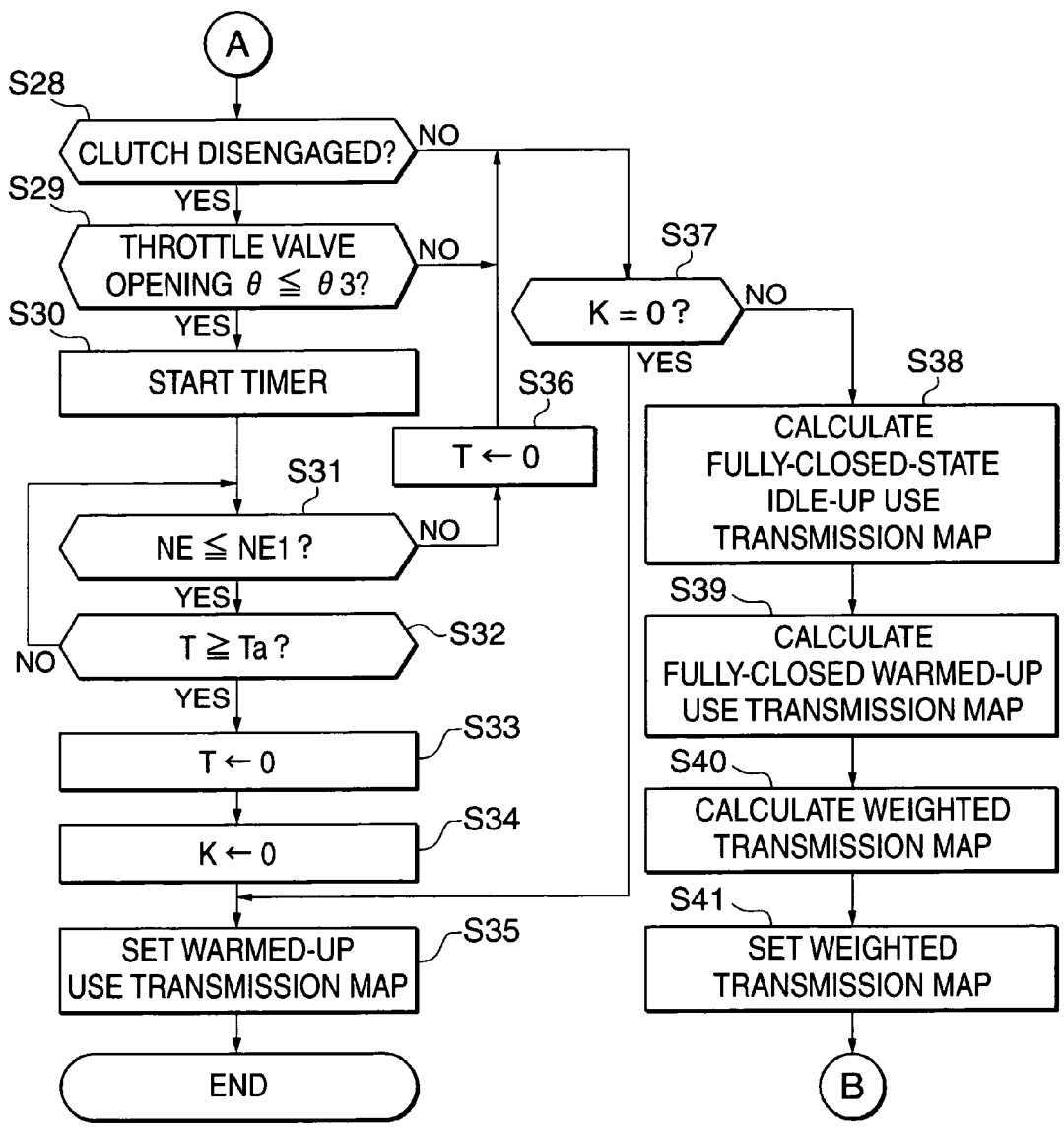
FIG. 11 is a continued part of the flowchart shown in FIG. 10.

FIGS. 10 and 11 are a flowchart of a second transmission control process executed by the control system for the CVT.

The present second transmission control process is started upon starting of the engine 61. During the start of the engine 61, the idle-up use transmission map is set to the control transmission map.

In the present transmission control process, it is determined whether or not the engine 61 is idling and whether engine braking is not operating, whereafter only when the engine 61 is idling or when engine braking is not operating, the weighting coefficient is calculated, and the weighted transmission map is changed. This is because if the weighted transmission map is changed for the motorcycle 10 when engine braking is operating, the rider feels poor steerability.

First, it is determined whether or not the vehicle speed V is not higher than the predetermined value V1 (step S21). If the vehicle speed V is not higher than the predetermined value V1 (YES to the step S21), it is determined whether or not the throttle valve opening θ is equal to or smaller than the predetermined value θ1 (step S22). If the throttle valve opening θ is equal to or smaller than the predetermined value θ1 (YES to the step S22), it is determined whether or not the centrifugal clutch mechanism 62 is disengaged (step S23). If the centrifugal clutch mechanism 62 is disengaged (YES to the step S23), it is judged that the engine 61 is idling, and an estimated idling speed NEf, i.e. an estimated value of the idling speed is calculated (step S24).

More specifically, in the step S24, by searching the idle-up map (FIG. 8A), a value of the idling speed corresponding to the intake air temperature and the coolant temperature detected by the IAT sensor 125 and the coolant temperature sensor 126, respectively, is calculated as the estimated idling speed NEf. The estimated idling speed NEf calculated in the step S24 at cold start of the engine 61 is equal to the maximum idling speed. Further, since this estimated-idling speed NEf is calculated in the step S24 based on the coolant temperature, the intake air temperature, and the idle-up map (FIG. 8A), and therefore there is a possibility that the estimated idling speed NEf differs from the actual idling speed 61. When the estimated idling speed NEf is lower than the actual idling speed, the engine 61 can stall or other inconveniences can occur. Therefore, in the idle-up map, the estimated idling speed NEf corresponding to the coolant temperature and the intake air temperature is set such that it cannot be lower than the actual idling speed.

On the other hand, if it is determined that the engine 61 is not idling, i.e. if the vehicle speed V is higher than the predetermined value V1 (NO to the step S21), if the throttle valve opening θ is larger than the predetermined value θ1 (NO to the step S22), or if the centrifugal clutch mechanism 62 is not disengaged (NO to the step S23), it is determined whether or not the vehicle speed V is not lower than the predetermined value V2 (step S25). If the vehicle speed V is not lower than the predetermined value V2 (YES to the step S25), it is determined whether or not the throttle valve opening θ is equal to or larger than the predetermined value θ2 (step S26). If the throttle valve opening θ is equal to or larger than the predetermined value θ2 (YES to the step S26), it is judged that the motorcycle 10 is in a state where engine braking is not operating, and the process proceeds to the step S24.

Then, the weighting coefficient K is calculated using the estimated idling speed NEf calculated in the step S24 (step S27). The calculation of the weighting coefficient K in the step S27 is carried out based on the following equation (1):

$$K = (\text{estimated idling speed NEf} - \text{minimum idling speed}) / \quad (1)$$
$$(\text{maximum idling speed} - \text{minimum idling speed})$$

Then, it is determined whether or not the centrifugal clutch mechanism 62 is disengaged (step S28). If the centrifugal clutch mechanism 62 is disengaged (YES to the step S28), it is determined whether or not the throttle valve opening θ is equal to or smaller than the predetermined value θ3 (step S29). If the throttle valve opening θ is equal to or smaller than the predetermined value θ3 (YES to the step S29), it is judged that the engine 61 is idling. Then, the timer is started (step S30), and it is determined whether or not the engine rotational speed NE has been not higher than the rotational speed NE1 over the predetermined time period Ta or longer (steps S31 and S32). If the engine rotational speed NE has been not higher than the rotational speed NE1 over the predetermined time period Ta or longer (YES to the steps S31 and S32), it can be judged that the engine rotational speed NE has been stable at approximately the minimum idling speed NEmin over the predetermined time period Ta or longer, which means that the engine 61 has terminated the idle-up state and entered the warmed-up state, and therefore the timer is stopped to reset the counted time T to "0" (step S33). Thereafter, the weighting coefficient K is reset to "0" (step S34), and the warmed-up use transmission map is set to the control transmission map (step S35), followed by terminating the present process.

On the other hand, if it is determined that the motorcycle 10 is in a state where engine braking is operating, i.e. if the vehicle speed V is lower than the predetermined value V2 (NO to the step S25) or if the throttle valve opening θ is smaller than the predetermined value θ2 (NO to the step S26), the steps S28 et seq. are executed without calculating the weighting coefficient K so as not to change the weighted transmission map. This is because if the weighted transmission map is changed, the rider will feel poor steerability.

As described above, in the idle-up map (FIG. 8A), the estimated idling speed corresponding to the intake air temperature and the coolant temperature is set such that it cannot be lower than the actual idling speed. Further, when it is determined that the engine 61 is idling (YES to the steps S28 and S29), and when the engine 61 has entered the warmed-up state after termination of the idle-up state (YES to the steps S31 and S32), the control transmission map is switched to the warmed-up use transmission map (step S35), and the transmission ratio of the CVT 64 is controlled by searching the warmed-up use transmission map. Therefore, it is possible to set the control transmission map to one adapted to the estimated idling speed closer to the actual idling speed, to thereby prevent engine braking of the motorcycle 10 from becoming too effective.

On the other hand, if it is not determined that the engine 61 is idling, i.e. if the centrifugal clutch mechanism 62 is not disengaged (NO to the step S28) or if the throttle valve opening is larger than the predetermined value θ3 (NO to the step S29), or if it is not determined that the engine 61 has entered the warmed-up state after termination of the idle-up state, i.e. if it is not determined that the engine rotational speed NE has been not higher than the rotational speed NE1 over the predetermined time period Ta or longer (NO to the step S31), the timer is reset to the counted time T of "0" (step S36), and then it is determined whether or not the weighting coefficient K is equal to "0" (step S37). If the weighting coefficient K is equal to "0" (YES to the step S37), the steps S35 et seq. are executed.

On the other hand, if the weighting coefficient K is not equal to "0" (NO to the step S37), the fully-closed-state idle-up use transmission map (FIG. 9) is calculated by searching the idle-up use transmission map (step S38), and the fully-closed-state warmed-up use transmission map (FIG. 9) is calculated by searching the warmed-up use transmission map (step S39). Then, the weighted transmission map is calculated based on the fully-closed-state idle-up use transmission map, the fully-closed-state warmed-up use transmission map, and the weighting coefficient K calculated in the step S27 (step S40), and the control transmission map is switched to the weighted transmission map (step S41), followed by the process returning to the step S21.

The calculation of the weighted transmission map in the step S40 is carried out based on the following equation (2):

$$\text{weighted transmission map} = \quad (2)$$
$$\text{fully-closed-state idle-up use transmission map} \times K +$$
$$\text{fully-closed-state warmed-up use transmission map} \times (1 - K)$$

As shown in FIG. 9, the weighted transmission map is set within a region represented by a shaded area between the fully-closed-state idle-up use transmission map and the fully-closed-state warmed-up use transmission map.

The weighting coefficient K becomes smaller with a decrease in the estimated idling speed NEf, and therefore, the weighted transmission map becomes closer to the fully-closed-state warmed-up use transmission map from the fully-closed-state idle-up use transmission map with a decrease in the estimated idling speed NEf. Therefore, a transmission ratio for each engine rotational speed can be set such that it becomes smaller to the lower limit in accordance with a decrease in the idling speed, which makes it possible to make engine braking as least effective as possible according to the idle-up state.

As described above, according to the second transmission control process, the weighted transmission map set within the region defined between the fully-closed-state idle-up use transmission map and the fully-closed-state warmed-up use transmission map according to the state of idle-up is set to the transmission map which is used when the throttle valve opening is equal to zero, and which makes it possible to adjust the effectiveness of engine braking of the motorcycle 10 (steps S38 to S41), whereby it is possible to make engine braking as least effective as possible according to the idle-up state and hence enhance steerability of the vehicle.

Further, according to the present transmission control process, when the vehicle speed V is not higher than the predetermined value V1 (YES to the step S21), the throttle valve opening θ is equal to or smaller than the predetermined value θ1 (YES to the step S22), and the centrifugal clutch mechanism 62 is disengaged (YES to the step S23), i.e. when it is determined that the engine 61 is idling, or when the vehicle speed V is not lower than the predetermined value V2 (YES to the step S25), and the throttle valve opening θ is equal to or larger than the predetermined value θ2 (YES to the step S26), i.e. when it is determined that the motorcycle 10 is in a state where engine braking is not operating, the estimated idling speed NEf is calculated (step S27), so that the weighted transmission map can never be changed when the motorcycle 10 is in a state where engine braking is operating, which makes it possible to prevent the rider from feeling poor steerability.

Furthermore, according to the present transmission control process, when it is determined that the engine 61 is idling (YES to the steps S28 and S29), and at the same time, that the engine 61 has entered the warmed-up state after termination of the idle-up state (YES to the steps S31 and S32), the control transmission map is switched from the idle-up use transmission map to the warmed-up use transmission map (step S35), and the transmission ratio of the CVT 64 is controlled by searching the warmed-up use transmission map, whereby it is possible to set the control transmission map to one adapted to the estimated idling speed closer to the actual idling speed and hence prevent engine braking of the motorcycle 10 from becoming too effective.

Although in the control system of the CVT according to the present embodiment, whether or not the centrifugal clutch mechanism 62 is disengaged, whether or not the throttle valve opening θ is equal to or smaller than the predetermined value θ3 below which the engine is idling, and whether or not the engine rotational speed NE has been stable at approximately the minimum idling speed NEmin over the predetermined time period Ta are determined (steps S28 to S33, S36) so as to set the control transmission map to one adapted to the estimated idling speed closer to the actual idling speed, the steps S28 to S33, and S36 may be omitted if required because the idle-up map (FIG. 8A) is set such that the estimated idling speed corresponding to the intake air temperature and the coolant temperature cannot be lower than the actual idling speed.

It should be noted that the present invention is not limited to the above-described embodiment, but it can be practiced in various forms, without departing from the spirit and scope thereof.

What is claimed is:

1. A control system for a continuously variable transmission of a motorcycle including an engine having a crankshaft for driving the continuously variable transmission for rotation, a driving wheel, and a centrifugal clutch disposed between the continuously variable transmission and the driving wheel for connecting and disconnecting between the engine and the driving wheel, the control system controlling a transmission ratio of the continuously variable transmission based on a transmission control map,
the control system comprising:
a storage device that stores an idle-up use transmission map and a warmed-up use transmission map as the transmission control map; and
a control device that carries out transmission control of the continuously variable transmission based on the idle-up use transmission map at start of the engine, and switches the transmission control map for use in the transmission control to the warmed-up use transmission map when at least one of a first condition that a predetermined time period preset based on a temperature of the engine has elapsed after the start of the engine and a second condition that rotational speed of the engine is lower than a predetermined idling engine speed is satisfied,
wherein the idle-up use transmission map and the warmed-up use transmission map are set such that the transmission ratio of the continuously variable transmission is set to a value based on idling speed of the engine at which the centrifugal clutch is to be engaged or disengaged.

2. A control system as claimed in claim 1, wherein the engine includes a throttle valve, and wherein the first condition is satisfied when the predetermined time period preset based on an engine coolant temperature has elapsed after the start of the engine, and the second condition is satisfied when the centrifugal clutch is disengaged, the throttle valve is fully closed, and at the same time the rotational speed of the engine is lower than a range of a idling speed preset for a state in which idle-up of the engine has been completed.

3. A control system as claimed in claim 1, wherein the engine includes a throttle valve, and wherein said control device switches the transmission control map for use in the transmission control to the warmed-up use transmission map when at least one of a third condition that traveling speed of the motorcycle is not lower than a predetermined value and a fourth condition that a degree of opening of the throttle valve is not less than a predetermined value is satisfied in addition to the at least one of the first condition and the second condition.

4. A control system for a continuously variable transmission of a motorcycle including an engine having a crankshaft for driving the continuously variable transmission for rotation, a driving wheel, and a centrifugal clutch disposed between the continuously variable transmission and the driving wheel for connecting and disconnecting between the engine and the driving wheel, the control system controlling a transmission ratio of the continuously variable transmission based on a transmission control map,
the control system comprising:
a storage device that stores an idle-up use transmission map and a warmed-up use transmission map as the transmission control map; and
a control device that carries out transmission control of the continuously variable transmission based on the idle-up use transmission map at start of the engine, and then corrects the idle-up use transmission map based on the warmed-up use transmission map according to an idle-up state of the engine to thereby carry out transmission control of the continuously variable transmission,
wherein the idle-up use transmission map is a high rotational speed map set such that rotational speed of the engine in the idle-up state becomes highest, and the warmed-up use transmission map is a low rotational speed map set such that the rotational speed of the engine in the idle-up state becomes lowest, and wherein said control device calculates interpolated values from the high rotational speed map and the low rotational speed map, based on idling speed of the engine estimated from a temperature of the engine, and carries out the correction for the idle-up use transmission map based on the calculated interpolated values.

5. A control system for a continuously variable transmission of a motorcycle including an engine having a crankshaft for driving the continuously variable transmission for rotation, a driving wheel, and a centrifugal clutch disposed between the continuously variable transmission and the driving wheel for connecting and disconnecting between the engine and the driving wheel, the control system controlling a transmission ratio of the continuously variable transmission based on a transmission control map, the control system comprising:
  a storage device that stores an idle-up use transmission map and a warmed-up use transmission map as the transmission control map; and
  a control device that carries out transmission control of the continuously variable transmission based on the idle-up use transmission map at start of the engine, and then corrects the idle-up use transmission map based on the warmed-up use transmission map according to an idle-up state of the engine to thereby carry out transmission control of the continuously variable transmission, wherein the idle-up use transmission map and the warmed-up use transmission map are set such that the transmission ratio of the continuously variable transmission is set to a value based on idling speed of the engine at which the centrifugal clutch is to be engaged or disengaged.

* * * * *